US009160125B2

(12) United States Patent
Ota et al.

(10) Patent No.: US 9,160,125 B2
(45) Date of Patent: Oct. 13, 2015

(54) BATTERY ADAPTER

(71) Applicants: Tomoyuki Ota, Anjo (JP); Hitoshi Suzuki, Anjo (JP); Yukio Kobayashi, Anjo (JP); Shingo Umemura, Anjo (JP)

(72) Inventors: Tomoyuki Ota, Anjo (JP); Hitoshi Suzuki, Anjo (JP); Yukio Kobayashi, Anjo (JP); Shingo Umemura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 423 days.

(21) Appl. No.: 13/676,688

(22) Filed: Nov. 14, 2012

(65) Prior Publication Data

US 2013/0130552 A1 May 23, 2013

(30) Foreign Application Priority Data

Nov. 18, 2011 (JP) ................................. 2011-252650

(51) Int. Cl.
H02J 7/00 (2006.01)
H01R 11/00 (2006.01)
H01R 13/66 (2006.01)
H01R 31/00 (2006.01)
H01R 31/06 (2006.01)
H01M 2/10 (2006.01)
H01M 10/42 (2006.01)
B25F 5/02 (2006.01)

(52) U.S. Cl.
CPC ............... *H01R 31/065* (2013.01); *B25F 5/02* (2013.01); *H01M 2/1033* (2013.01); *H01M 10/425* (2013.01); *H01R 31/06* (2013.01); *H02J 7/0044* (2013.01); *H02J 7/0063* (2013.01); *H01M 2200/30* (2013.01)

(58) Field of Classification Search
CPC ... H01R 31/065; H01R 31/06; H01M 10/425; H01M 2/1033; H01M 10/501; H01M 10/5012; H01M 10/5014; B25F 5/02; H02J 7/0044; H02J 7/0063

USPC ............ 320/106, 112, 114; 439/504, 620.21, 439/639
See application file for complete search history.

(56) References Cited

U.S. PATENT DOCUMENTS 5,028,858 A 7/1991 Schnizler et al.
5,418,403 A * 5/1995 Morell, III ...................... 307/72
(Continued)

FOREIGN PATENT DOCUMENTS

| JP | 2008-178278 A | 7/2008 |
| JP | 2011-161602 A | 8/2011 |
| WO | WO 2011/099349 | 8/2011 |

OTHER PUBLICATIONS

Dec. 2, 2014 Office Action issued in Japanese Application No. 2011-252650.
(Continued)

Primary Examiner — M'Baye Diao
(74) Attorney, Agent, or Firm — Oliff PLC

(57) ABSTRACT

A battery adapter can include a plurality of machine-side-connecting sections capable of being connected to a plurality of battery-connecting ports provided on an electric machine, and a battery-side-connecting section(s) to which a battery or batteries can be connected. The number of the machine-side-connecting sections is preferably configured to be larger than the number of the battery-side-connecting section(s). Further, the electric machine is preferably connected to the machine-side-connecting sections of the battery adapter through its battery-connecting ports. The electric machine can be driven by the battery or batteries connected to the battery-side-connecting section(s) of the battery adapter.

19 Claims, 14 Drawing Sheets

(56) References Cited

U.S. PATENT DOCUMENTS

| | | | |
|---|---|---|---|
| 6,007,373 A * | 12/1999 | Chew | 439/504 |
| 6,087,815 A * | 7/2000 | Pfeifer et al. | 323/282 |
| 6,166,519 A * | 12/2000 | Gault | 320/107 |
| 6,806,683 B2 * | 10/2004 | Saldana et al. | 320/110 |
| 7,576,516 B2 * | 8/2009 | Greenslade | 320/110 |
| 2004/0108837 A1 * | 6/2004 | Lai et al. | 320/137 |
| 2005/0280393 A1 | 12/2005 | Feldmann | |
| 2007/0210744 A1 * | 9/2007 | Watson et al. | 320/112 |
| 2009/0108806 A1 | 4/2009 | Takano et al. | |
| 2012/0139500 A1 * | 6/2012 | Ye et al. | 320/135 |
| 2013/0025893 A1 * | 1/2013 | Ota et al. | 173/2 |

OTHER PUBLICATIONS

Extended Search Report issued in European Patent Application No. 12193032.5 dated May 8, 2014.

\* cited by examiner

BATTERY ADAPTER

This application claims priority to Japanese patent application serial number 2011-252650, the contents of which are incorporated herein by reference.

BACKGROUND OF THE INVENTION

1. Field of the Invention

Certain embodiments of the present invention relate to a battery adapter provided with a plurality of machine-side-connecting sections capable of being connected to a plurality of battery-connecting ports provided in an electric machine, and with a battery-side-connecting section to which a battery can be connected.

2. Description of the Related Art

Generally speaking, in an electric tool or an electric working device (hereinafter termed an electric machine), a battery that corresponds to a rated voltage of a motor of the electric machine is used. For example, in the case of an electric machine with a DC voltage of 36 volts, a battery with a DC voltage of 36 volts is usually used. However, batteries with a DC voltage of 36 volts are rather expensive and are not widely available in the market. In contrast, batteries with a DC voltage of 18 volts are generally used and widely available in the market.

U.S. Pat. No. 5,028,858 discloses an electric tool with a DC voltage of 36 volts that is constructed such that two batteries with a DC voltage of 18 volts can be connected to the electric tool. As shown in FIG. 14, an electric tool 100 as disclosed in the above-mentioned patent document is provided with two battery-connecting ports 103 so that two batteries 102 with a DC voltage of 18 volts can be connected to the ports 103. Further, the electric tool 100 includes an electric circuit for connecting the two batteries 102 in series. Thus, it is possible to drive an electric tool with a DC voltage of 36 volts by generally-used batteries with a DC voltage of 18 volts.

However, in an electric tool with a DC voltage of 36 volts provided with two battery-connecting ports (hereinafter termed as "a two-port electric tool") for batteries with a DC voltage of 18 volts, it is impossible to use a battery with a DC voltage of 36 volts. Nor is it possible to drive a two-port electric tool with a DC voltage of 36 volts by a single battery with a DC voltage of 18 volts.

In this way, a two-port electric tool is not easy to use.

SUMMARY OF THE INVENTION

Thus, there is a need in the art to make it possible for an electric machine provided with a plurality of battery-connecting ports to be operated by a smaller number of batteries than the number of the battery-connecting ports of the electric machine, thereby improving the usability of the electric machine provided with a plurality of battery-connecting ports.

One construction for a battery adapter can include a plurality of machine-side-connecting sections capable of being connected to a plurality of battery-connecting ports provided in an electric machine, and (a) battery-side-connecting section(s) to which a battery or batteries can be connected, where the number of the machine-side-connecting sections is preferably configured to be larger than the number of the battery-side-connecting section(s). Further, the electric machine connected to the machine-side-connecting sections of the battery adapter via the battery-connecting ports of the electric machine can be driven by the battery or batteries connected to the battery-side-connecting section(s) of the battery adapter.

In the battery adapter according to the construction, the number of machine-side-connecting sections is preferably configured to be larger than the number of battery-side-connecting section(s). For example, when the number of machine-side-connecting sections is two, the number of battery-side-connecting section(s) is preferably one. Further, the electric machine connected to the machine-side-connecting sections of the battery adapter via the battery-connecting ports of the electric machine can be driven by the battery or batteries connected to the battery-side-connecting section(s) of the battery adapter.

In this way, by using a battery adapter according to the construction, it is possible to drive, for example, an electric machine provided with two battery-connecting ports by use of a single battery. As a result, it is possible to improve the usability of an electric machine provided with a plurality of battery-connecting ports.

According to another construction, the electric machine connected to the machine-side-connecting sections of the battery adapter via the battery-connecting ports of the electric machine can be driven, with a battery of a nominal voltage that is the same as the rated voltage of a motor of the electric machine being connected to the battery-side-connecting section(s) of the battery adapter.

For this reason, by using the above-described battery adapter, it is possible to drive, for example, a two-port electric machine with a DC voltage of 36 volts by a single battery with a DC voltage of 36 volts.

According to another construction, the sum of the voltages applied to the machine-side-connecting sections of the battery adapter is equal to the rated voltage of the motor of the electric machine.

For this reason, by using the above-described battery adapter, it is possible to drive, for example, a two-port electric machine with a DC voltage of 36 volts provided with two battery-connecting ports for DC 18 volts by a single battery with a DC voltage of 36 volts.

According to another construction, a battery adapter includes a step-down section configured to reduce the battery voltage applied to the battery-side-connecting section(s) to the rated voltage of the motor of the electric machine.

For this reason, by using the above-described battery adapter, it is possible to drive, for example, a two-port electric machine with a DC voltage of 18 volts by a single battery with a DC voltage of 36 volts.

According to another construction, the output voltage of the step-down section is equal to the voltage applied to one of the machine-side-connecting sections.

According to another construction, the output voltage of the step-down section is applied between positive and negative terminals of different sets of the plurality of machine-side-connecting sections.

According to another construction, a battery adapter includes a step-up section configured to increase the battery voltage applied to the battery-side-connecting section(s) to the rated voltage of the motor of the electric machine.

For this reason, by using the battery adapter described above, it is possible to drive, for example, a two-port electric machine with a DC voltage of 36 volts by a single battery with a DC voltage of 18 volts.

According to another construction, the output voltage of the step-up section is configured to be equal to the sum of the voltages applied to the machine-side-connecting sections.

According to another construction, the output voltage of the step-up section is equal to the voltage applied to one of the machine-side-connecting sections.

According to another construction, the output voltage of the step-up section is applied between positive and negative terminals of different sets of the plurality of machine-side-connecting sections.

According to the above, it is possible to operate an electric machine having a plurality of battery-connecting ports by a smaller number of batteries than the number of battery-connecting ports of the electric machine. In this way, the usability of an electric machine provided with a plurality of battery-connecting ports can be improved.

Each of the additional features and teachings disclosed above and below may be utilized separately or in conjunction with other features and teachings to provide improved battery adapters. Representative examples of the present teaching, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

DESCRIPTION OF THE PREFERRED EMBODIMENTS

In the following, a battery adapter according to an example will be described with reference to FIG. 1 to FIG. 5. The battery adapter according to the example is for use in electric machines, such as a blower.

The forward, backward, leftward, rightward, upward, and downward directions in the figures correspond to the forward, backward, leftward, rightward, upward, and downward directions in the blower.

Figure 1:
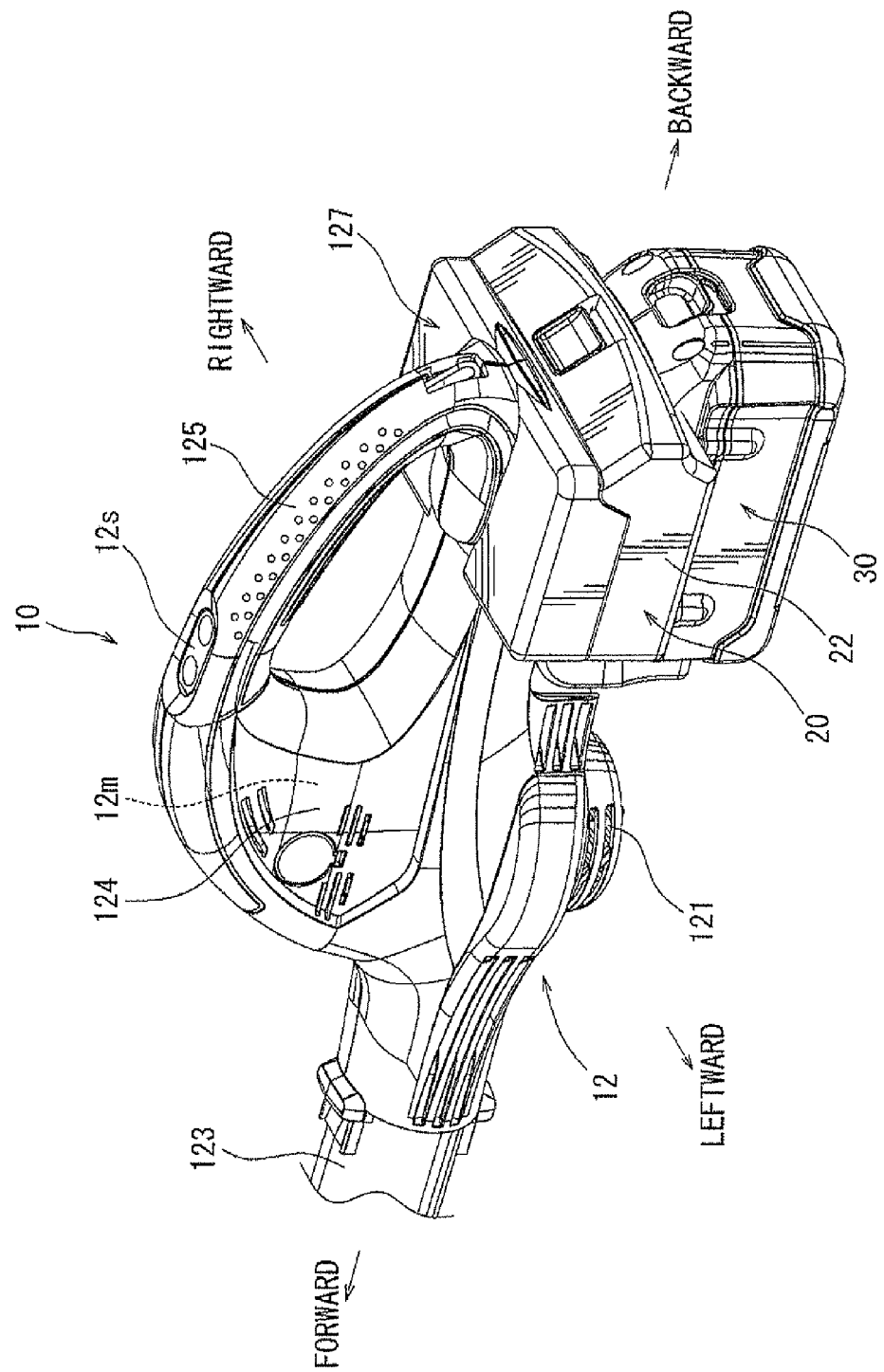
FIG. 1 is an overall perspective view of a blower (en electric machine) provided with a battery adapter according to an example of the present invention.
Figure 2:
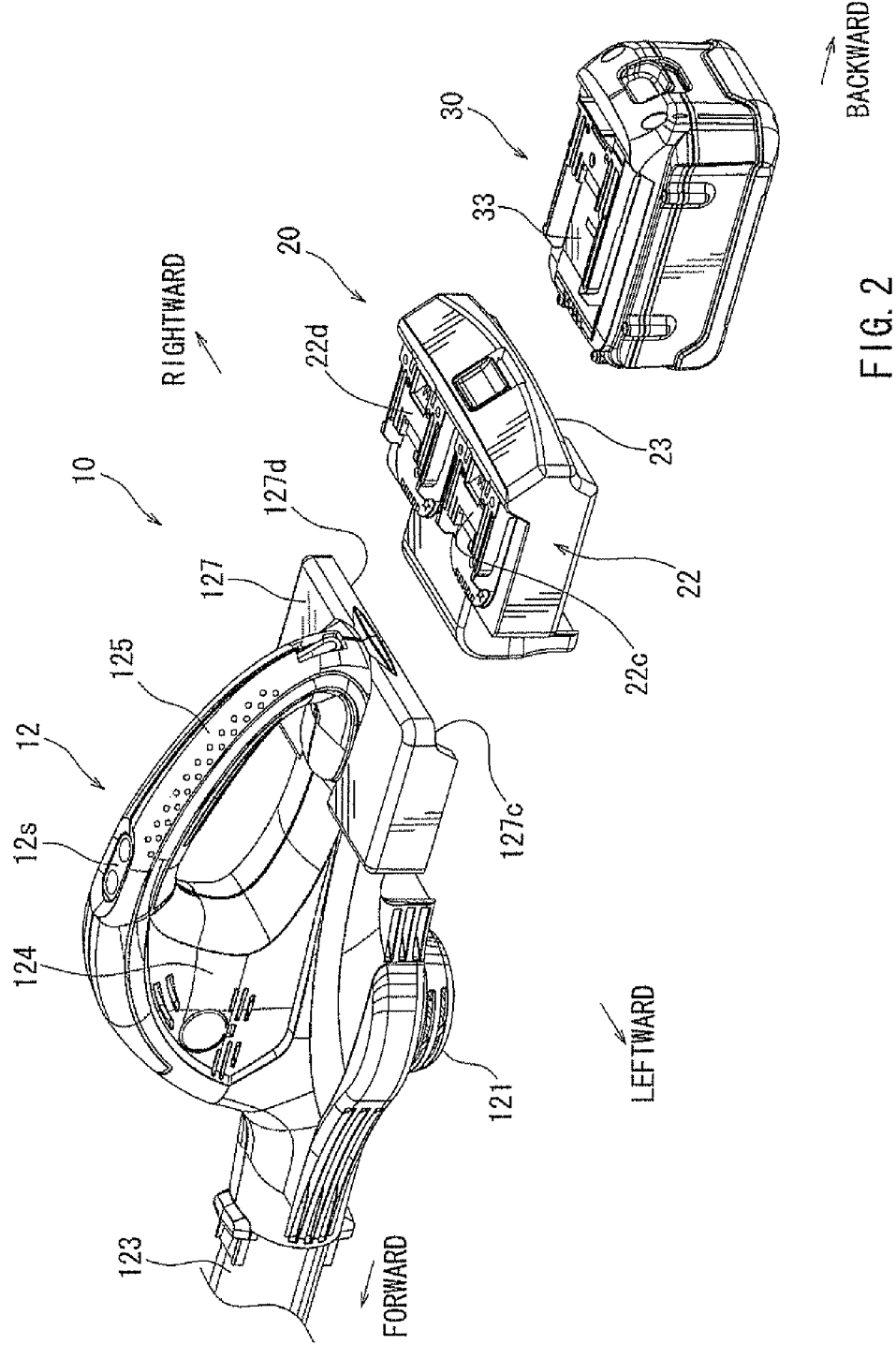
FIG. 2 is an exploded perspective view of the electric machine, viewed from above.
Figure 3:
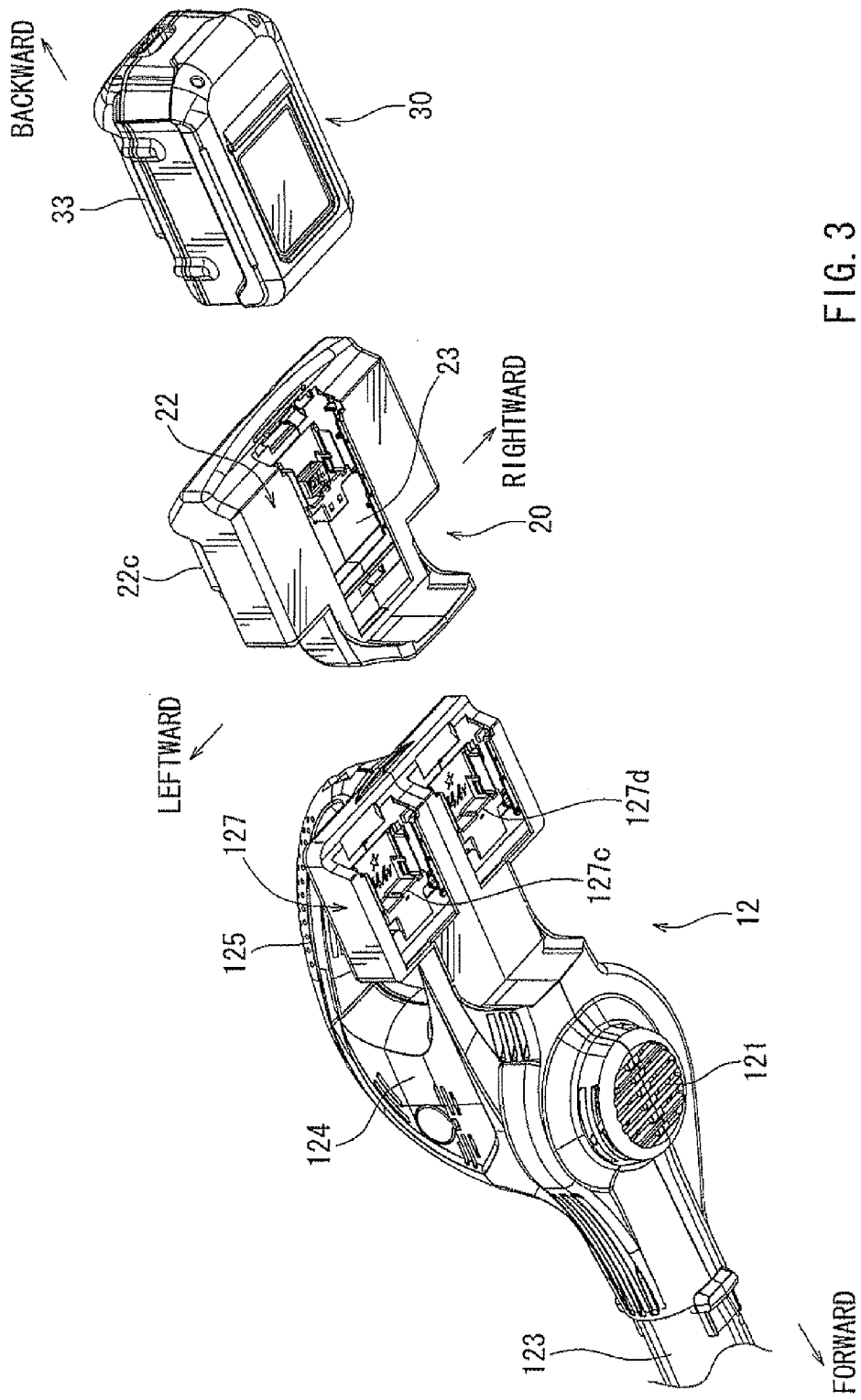
FIG. 3 is an exploded perspective view of the electric machine, viewed from below.

The blower 10 is an equipment for blowing away dust, dirt, dust or the like. As shown in FIGS. 1 to 3, the blower 10 includes a blower main body 12, a battery adapter 20, and a battery pack 30 (hereinafter termed the battery 30).

Before describing the battery adapter 20, the configuration of the blower main body 12 will be briefly described.

The blower main body 12 is configured such that air sucked in through a rotating fan (not shown) from an air intake port 121 provided in the central lower surface of the blower main body 12 can be purged through a nozzle 123 at a distal end (front end) of the blower main body 12. At the central part of the blower main body 12, a housing part 124 for housing the fan and a motor 12m, etc. is provided above the air intake port 121. A grip part 125 extends from above the housing part 124 to the rear end position of the blower main body 12. A main switch 12s of the blower main body 12 is provided at an upper position of the grip part 125. Further, at the rear end position of the blower main body 12, a battery connection part 127 is provided.

A battery adapter 20, which is described below, or two DC 18 volts batteries (not shown) may be connected to the battery connection part 127. As shown in FIG. 3, there are provided two sets of battery-connecting ports 127c and 127d on the lower surface side of the battery connection part 127 to which the battery adapter 20 or two DC 18 volts batteries (not shown) can be connected (for example, through a sliding motion).

Figure 4:
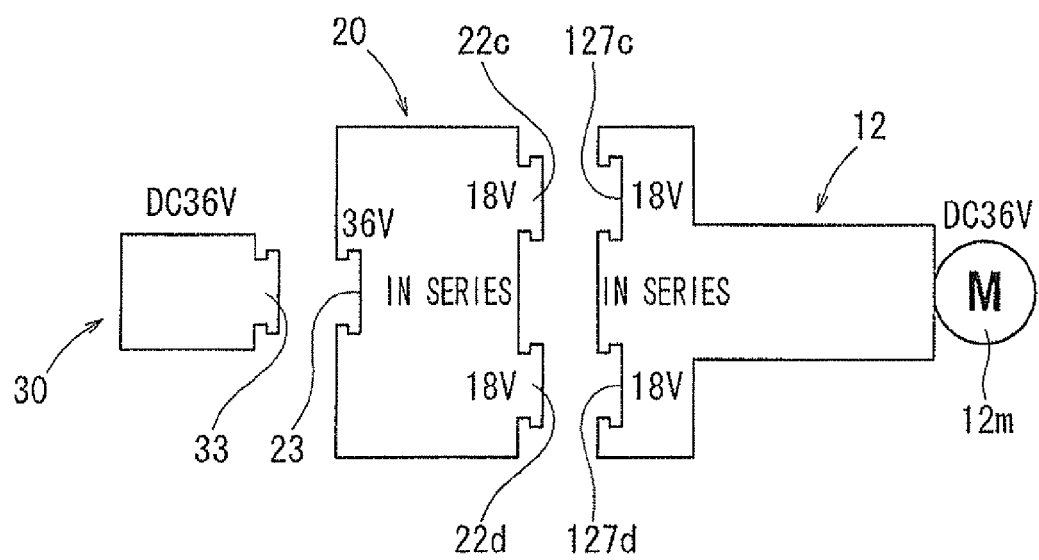
FIG. 4 is a diagram showing the configuration of the electric machine.
Figure 5:
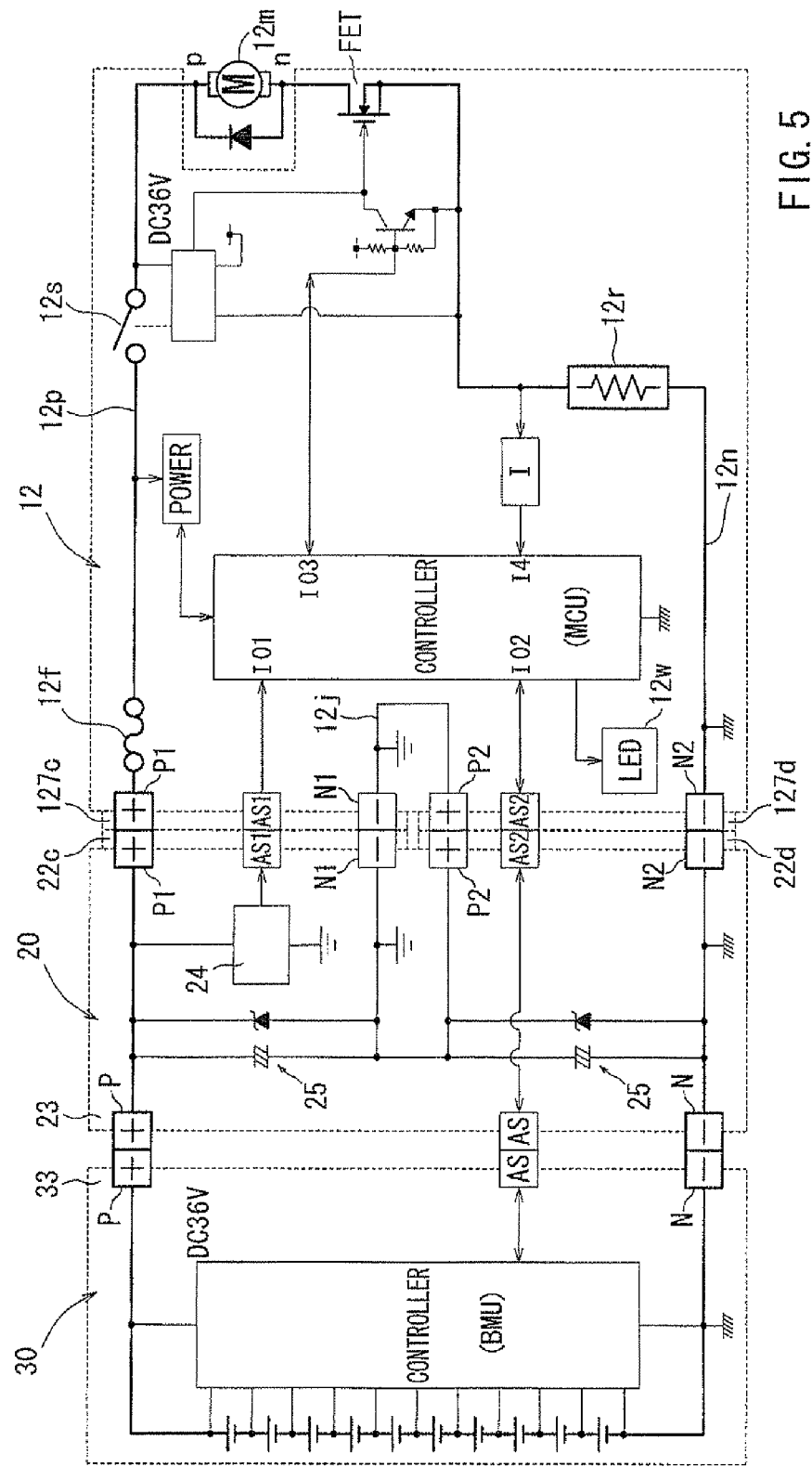
FIG. 5 is a schematic block diagram showing an electric circuit of the electric machine.

The blower main body 12 shown in FIGS. 4 and 5 can be driven by the motor 12m rated at 36 VDC. As shown in FIG. 5, one end of a positive power line 12p of the blower main body 12 is connected to a positive terminal P1 of the first battery connection port 127c, and the other end the of the positive power line 12p is connected to a positive terminal p of the motor 12m. A fuse 12f and the main switch 12s are connected in series between the two ends of the positive power line 12p. Further, one end of a negative power line 12n of the blower main body 12 is connected to a negative terminal N2 of the second battery connection port 127d, and the other end of the negative power line 12n is connected to a negative terminal n of the motor 12m. Between the two ends of the negative power line 12n, a switching element FET, for adjusting the power supplied to the motor 12m, and a shunt resistor 12r, for detecting a load current of the motor 12m, are connected in series.

Further, as shown in FIG. 5, a negative terminal N1 of the first battery connection port 127c and a positive terminal P2 of the second battery connection port 127d are electrically connected to each other by a jumper line 12j. Therefore, when DC 18 volts batteries (not shown) are respectively connected to the first battery connection port 127c and the second battery connection port 127d, the batteries are connected to each other in series, with the result that a voltage of DC 36 volts is applied to the motor 12m.

Further, a controller MCU (refer to FIG. 5) is mounted in the housing part 124 of the blower main body 12. The controller MCU is configured to operate the switching FET to control the motor 12m (refer to an IO3 terminal). When a discharge signal (discharge enabling signal) is input via AS terminals of the first battery connection port 127c and the second battery connection port 127d (refer to IO1 and IO2 terminals), the controller MCU operate to control the motor 12m. Further, the load current of the motor 12m is input to the controller MCU (refer to a terminal 14). When the controller MCU receives an overload current, the MCU stops the motor 12m, and also outputs an overload signal to the battery via the AS terminal. Further, the controller MCU can output a display signal to a display circuit 12w of the blower main body 12.

The battery adapter 20, which is provided with the first battery connection port 127c and the second battery connection port 127d, uses a single battery 30 rated at 36 VDC for driving the blower main body 12 rated at 36 VDC.

As shown in FIGS. 2 and 3, the battery adapter 20 is provided with a thin boxlike housing 22. On an upper surface of the housing 22, there is provided a first machine-side-connecting section 22c and a second machine-side-connecting section 22d which can be connected through sliding action to the first battery connection port 127c of the blower main body 12 and the second battery connection port 127d of the blower main body 12, respectively. Further, on the lower surface side of the housing 22, there is provided a battery-side-connecting section 23 to which a connection part 33 of the battery 30 rated at 36 VDC can be connected via slide action.

As shown in FIG. 5, provided on the first machine-side-connecting section 22c are a positive terminal P1, a negative terminal N1, and an AS1 terminal to which the positive terminal P1, the negative terminal N1, and an AS1 terminal of the first battery connection port 127c of the blower main body 12 are respectively connected. Further, provided on the second machine-side-connecting section 22d is a positive terminal P2, a negative terminal N2, and an AS2 terminal to which the positive terminal P2, the negative terminal N2, and an AS2 terminal of the second battery connection port 127d of the blower main body 12 are respectively connected.

Further, on the battery-side-connecting section 23 there is provided a positive terminal P, a negative terminal N, and an AS terminal to which a positive terminal P, a negative terminal N, and an AS terminal provided on the connection part 33 of the battery 30 are respectively connected. The positive terminal P of the battery-side-connecting section 23 is connected to the positive terminal P1 of the first machine-side-connecting section 22c, and the negative terminal N of the battery-side-connecting section 23 is connected to the negative terminal N2 of the second machine-side-connecting section 22d. Further, the AS terminal of the battery-side-connecting section 23 is connected to the AS2 terminal of the second machine-side-connecting section 22d. Accordingly, a signal from a controller BMU of the battery 30, such as an over-discharge signal (discharge inhibit signal) etc., is input to the IO2 terminal of the controller MCU of the blower main body 12 via the AS2 terminal of the second machine-side-connecting section 22d of the battery adapter 20. Further, an operation signal for the main switch 12s from the controller MCU of the blower main body 12 is also transmitted to the controller BMU of the battery 30 via the AS2 terminal of the second machine-side-connecting section 22d.

In the battery adapter 20, there is provided a discharge output circuit 24 that can output a discharge signal. The output signal is input to the IO1 terminal of the controller MCU of the blower main body 12 via the AS1 terminal of the first machine-side-connecting section 22c. The controller MCU of the blower main body 12 controls the motor 12m according to an over-discharge signal (discharge inhibit signal) or a discharge signal (discharge enabling signal) input to the IO2 terminal.

Further, in the battery adapter 20, there is provided a constant-voltage circuit 25 configured such that the same approximate voltage is applied between the positive terminal P1 and the negative terminal N1 of the first machine-side-connecting section 22c and between the positive terminal P2 and the negative terminal N2 of the second machine-side-connecting section 22d.

Next, an operation of the battery adapter 20 will be described.

First, the battery 30 is connected, preferably through slide movement, to the battery-side-connecting section 23 of the battery adapter 20, and then, the first machine-side-connecting section 22c and the second machine-side-connecting section 22d of the battery adapter 20 are connected to the first battery connection port 127c and the second battery connection port 127d of the blower main body 12 through sliding motion, as shown in FIG. 1. As a result, as shown in FIG. 5, the positive terminal P of the battery 30 is connected to the positive terminal P1 of the first battery connection port 127c of the blower main body 12 via the positive terminal P1 of the first machine-side-connecting section 22c of the battery adapter 20. Further, the negative terminal N of the battery 30 is connected to the negative terminal N2 of the second battery connection port 127d of the blower main body 12 via the negative terminal N2 of the second machine-side-connecting section 22d of the battery adapter 20. Further, the AS terminal of the battery 30 is connected to the AS2 terminal of the second battery connection port 127d of the blower main body 12 via the AS2 terminal of the second machine-side-connecting section 22d of the battery adapter 20.

As a result, DC 18 volts is applied between the positive terminal P1 and the negative terminal N1 of the first battery connection port 127c and between the positive terminal P2 and the negative terminal N2 of the second battery connection port 127d of the blower main body 12. That is, the voltage of the first battery connection port 127e (DC 18 volts) and the voltage of the second battery connection port 127d (DC 18 volts) are applied in series to the motor 12m of the blower main body 12. As a result, it is possible to drive the blower main body 12 rated at 36 VDC, which is provided with the first battery connection port 127c and the second battery connection port 127d, by use of a single battery 30 rated at 36 VDC.

In the battery adapter 20 according to the example, it is possible to drive the blower main body 12 (electric machine) provided with a plurality of (two) battery-connecting ports 127c and 127d by use of a single battery 30. This can improve the usability of the blower main body 12 provided with a plurality of (two) battery-connecting ports 127c and 127d.

Further, the sum of the voltages applied to the machine-side-connecting sections 22c and 22d (DC 18 volts) of the battery adapter 20 is equal to the rated voltage (DC 36 volts) of the motor 12m of the blower main body 12 (electric machine). For this reason, the above-described battery adapter 20 makes it possible to drive a two-port blower main body 12 (electric machine) rated at 36 VDC, which is provided with two battery-connecting ports 127c and 127d for batteries rated at 18 VDC, by use of a single battery rated at 36 VDC.

In the following, a battery adapter 40 according to another example will be described with reference to FIGS. 6 to 8.

Figure 6:
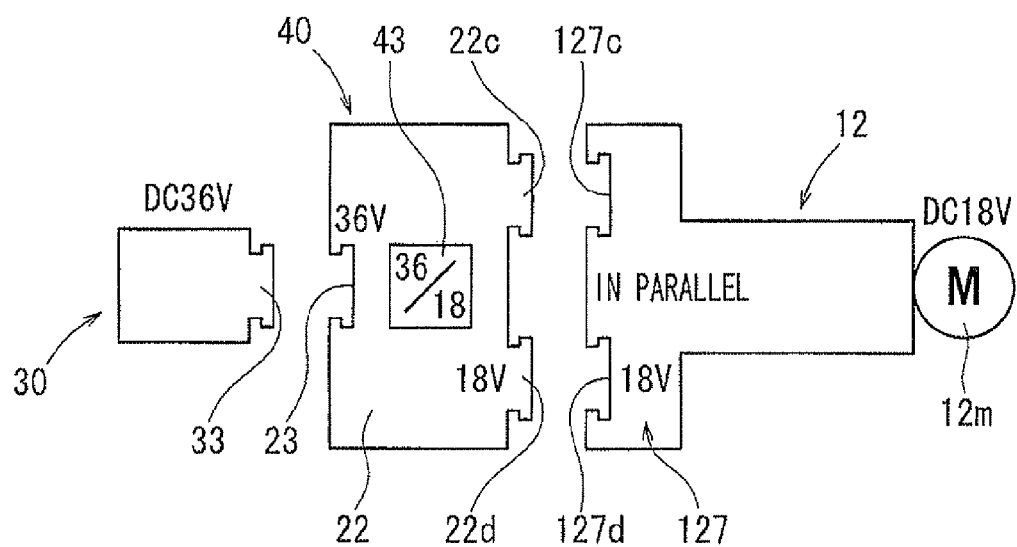
FIG. 6 is a diagram showing the configuration of an electric machine provided with a battery adapter according to another example.

As shown in FIG. 6, the battery adapter 40 according to the example can drive an electric machine 12 rated at 18 VDC provided with a first battery connection port 127c and a second battery connection port 127d by use of a single battery 30 rated at 36 VDC. The basic configuration of the battery adapter 40 according to the example is the same as that of the battery adapter 20 according to the first example. Therefore, the members that are the same as those of the battery adapter 20 according to the first example are indicated by the same reference numerals, and an explanation of the battery adapter 40 will be left out.

Figure 7:
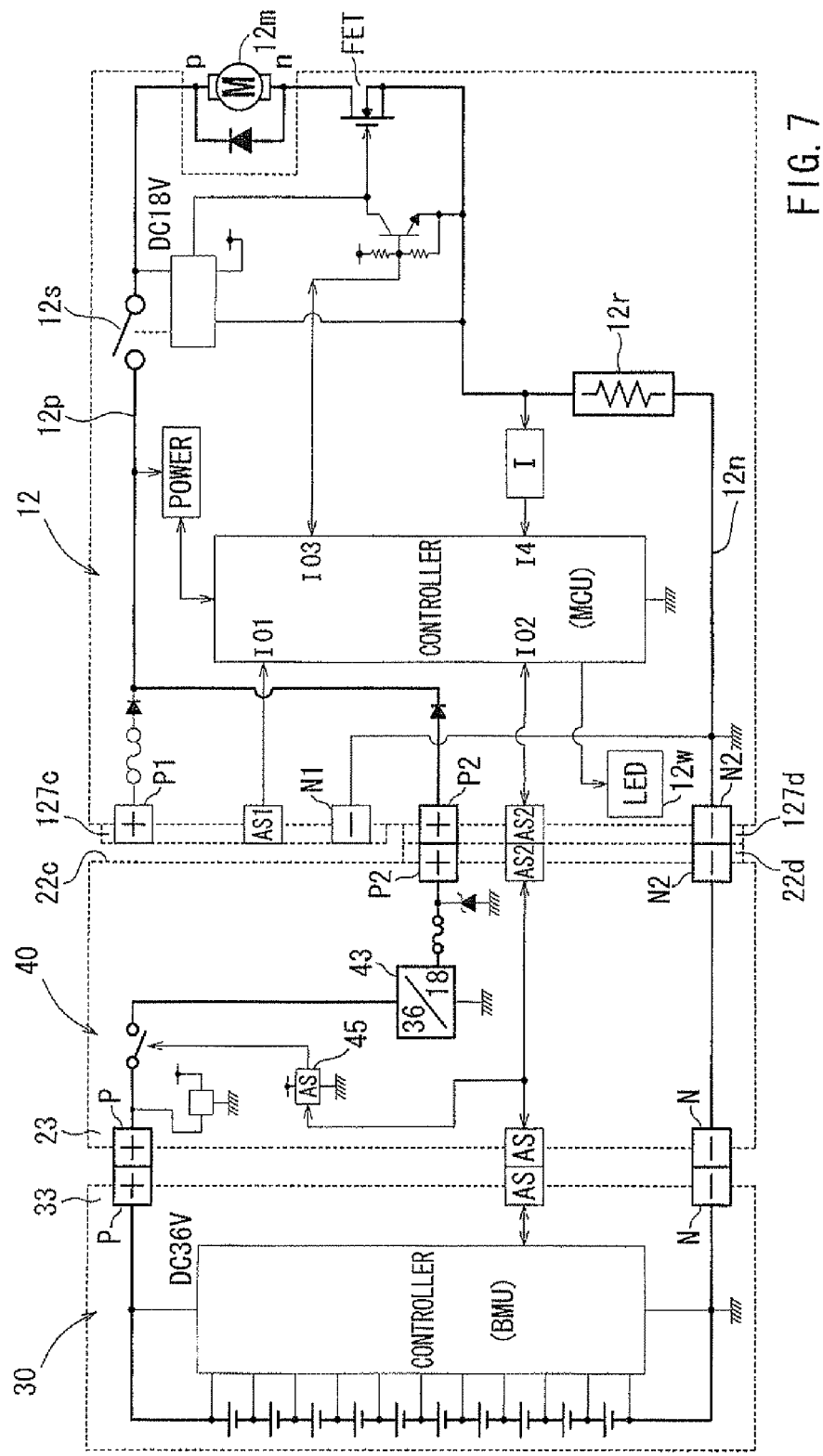
FIG. 7 is a schematic block diagram showing an electric circuit of the electric machine.
Figure 8:
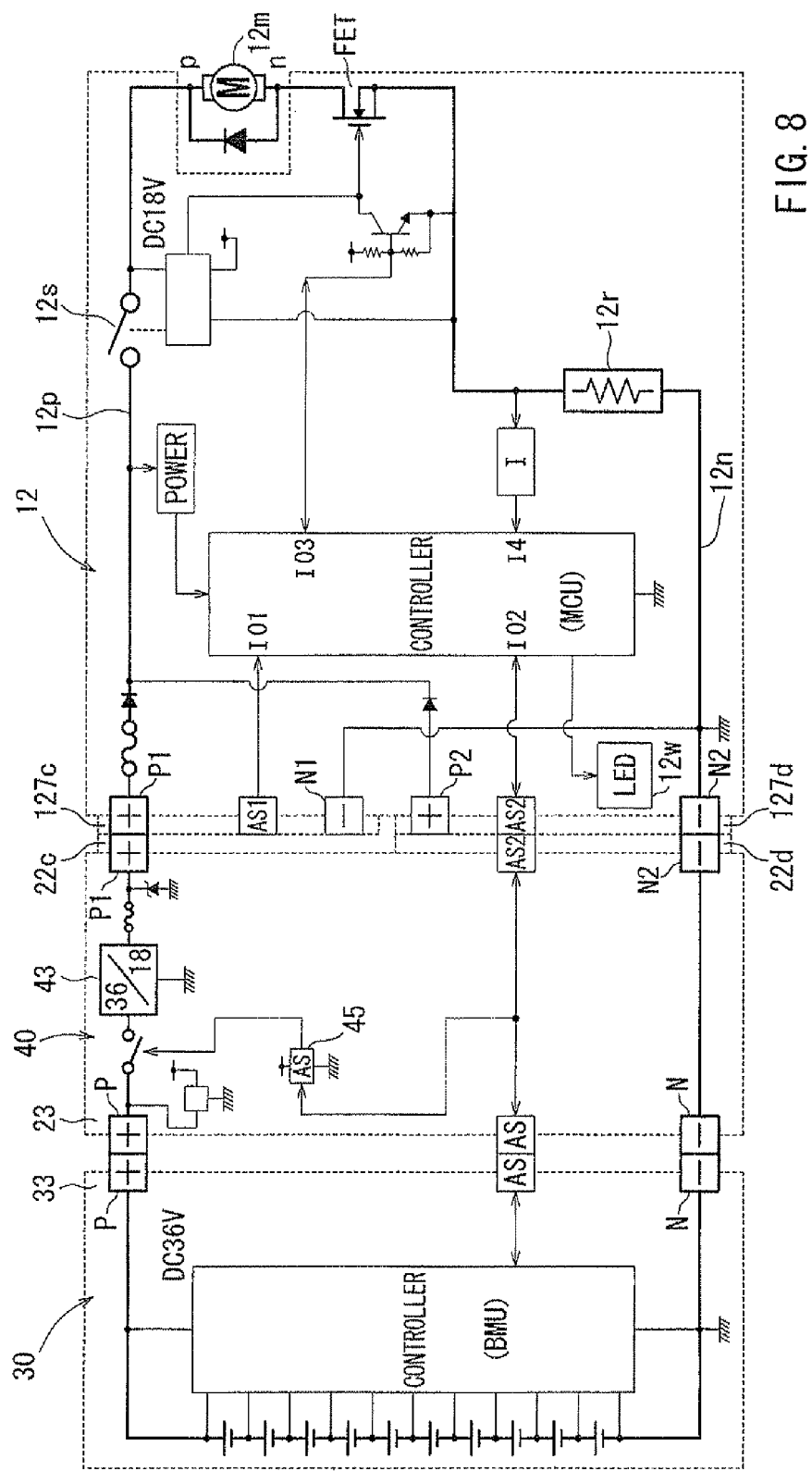
FIG. 8 is a schematic block diagram showing an electric circuit of the electric machine.

As shown in FIG. 7, the electric machine 12 of this example is configured such that a battery rated at 18 VDC (not shown) can be connected in parallel to the first battery connection port 127c and the second battery connection port 127d. That is, in the above electric machine 12, the parallel connection is made between the positive terminal P1 and the negative terminal N1 of the first battery connection port 127c and between the positive terminal P2 and the negative terminal N2 of the second battery connection port 127d. As a result, the approximately same voltage that is applied to the first battery connection port 127c and the second battery connection port 127d (DC 18 volts) will be applied to the motor 12m.

As is the case with the first example, the battery adapter 40 is provided with a first machine-side-connecting section 22c and a second machine-side-connecting section 22d. However, as shown in FIG. 7, the first machine-side-connecting section 22c of the battery adapter 40 does not include positive and negative terminals, and solely allows a mechanical connection with the first battery connection port 127c of the electric machine 12. That is, only the second machine-side-connecting section 22d of the battery adapter 40 can be electrically connected to the second battery connection port 127d of the electric machine 12.

The battery adapter 40 is provided with a step-down section 43 configured to reduce the voltage (DC 36 volts) applied to the positive terminal P and the negative terminal N of the battery-side-connecting section 23. The step-down section 43 is configured to reduce DC 36 volts to DC 18 volts. The output voltage (DC 18 volts) of the step-down section is applied between the positive terminal P2 and the negative terminal N2 of the second machine-side-connecting section 22d. As a result, a voltage of DC 18 volts is applied to the second battery connection port 127d of the electric machine 12.

Further, the battery adapter 40 is provided with an AS output circuit 45. The AS output circuit is configured to shut off the input power of the step-down section 43 upon receiving an operation signal for the main switch 12s from the controller MCU of the electric machine 12, or an over-discharge signal, etc., from the controller BMU of the battery 30.

Therefore, the above-described battery adapter 40 makes it possible to drive the electric machine 12 provided with the first battery connection port 127c and the second battery connection port 127d by use of a single battery 30 rated at 36 VDC. In this way, it is possible to use the battery 30 rated at 36 VDC in order to drive the electric machine 12 rated at 1 VDC, and thus the electric machine may be advantageously operated for a longer period of time.

The above construction may not be limited by the above-described example and various changes may be made without departing from the scope of the invention. In FIG. 7, only the second machine-side-connecting section 22d is used, without electrically using the first machine-side-connecting section 22c of the battery adapter 40. However, as shown in FIG. 8, it is possible to apply DC 18 volts between the positive terminal P1 of the first machine-side-connecting section 22c and the negative terminal N2 of the second machine-side-connecting section 22d, for example. That is, it is possible to apply a voltage of DC 18 volts to the motor 12m via the positive terminal P1 of the first battery connection port 127c and the negative terminal N2 of the second battery connection port 127d of the electric machine 12.

In the following, a battery adapter 50 according to another example will be described with reference to FIGS. 9 to 13.

Figure 9:
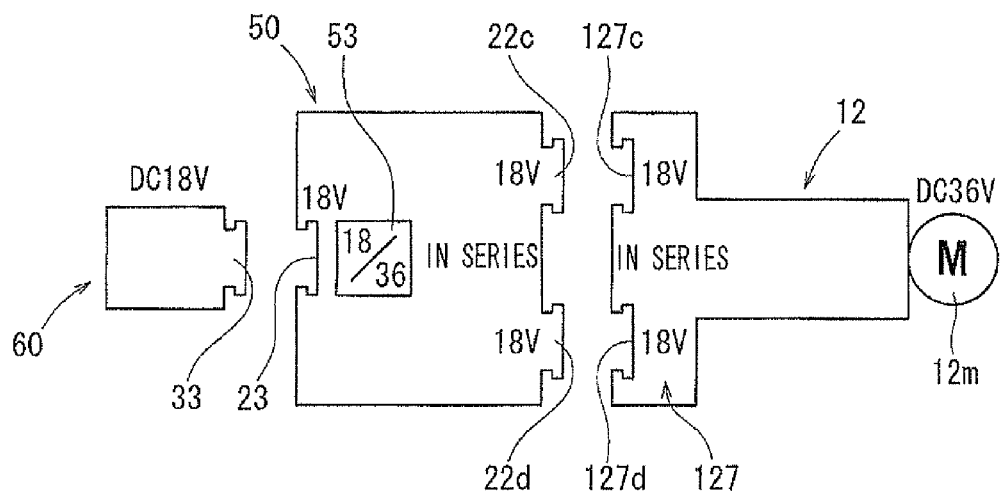
FIG. 9 is a diagram showing the configuration of an electric machine provided with a battery adapter according to another example.

As shown in FIG. 9, the battery adapter 50 according to the example can drive the electric machine 12 rated at 36 VDC provided with the first battery connection port 127c and the second battery connection port 127d by use of a single battery 60 rated at 18 VDC. The basic configuration of the battery adapter 50 according to the example is the same as that of the battery adapter 20 according to the first example. Therefore, the members that are the same as those of the battery adapter 20 according to the first example are indicated by the same reference numerals, and a description of the battery 50 will be left out.

Further, the electric machine 12 in the example is the same as the electric machine 12 in the first example. Therefore, the members of the electric machine 12 are indicated by the same reference numerals, and a description of the electric machine 12 will be left out.

Figure 10:
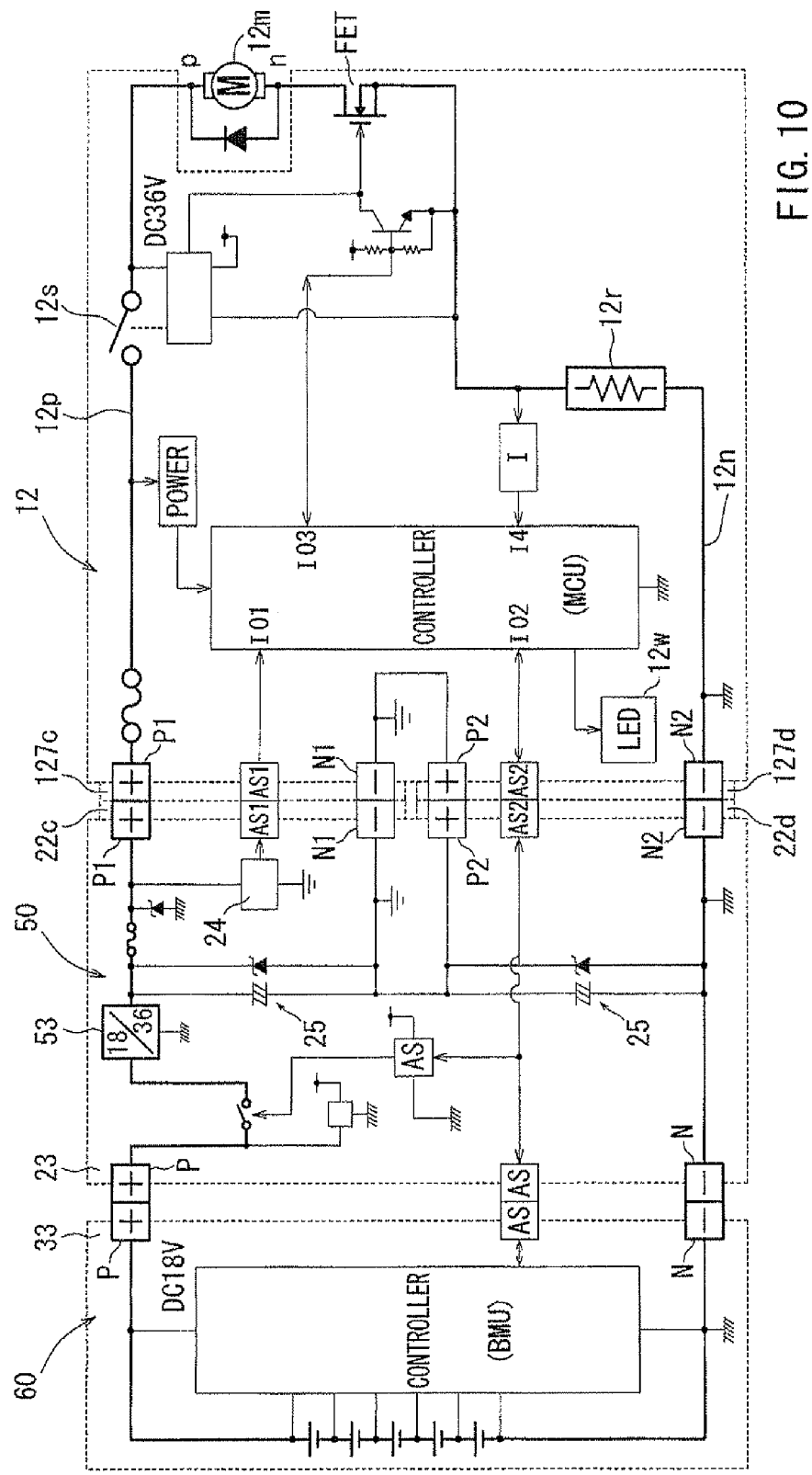
FIG. 10 is a schematic block diagram showing an electric circuit of the electric machine.

As shown in FIG. 10, the battery adapter 50 is provided with a step-up section 53 configured to increase the voltage (DC 18 volts) applied to the positive terminal P and the negative terminal N of the battery-side-connecting section 23. The step-up section 53 is configured to increase DC 18 volts to DC 36 volts. The output voltage (DC 36 volts) of the step-up section is applied between the positive terminal P1 of the first machine-side-connecting section 22c and the negative terminal N2 of the second machine-side-connecting section 22d. Further, on the output side of the step-up section 53, there is provided a constant-voltage circuit 25 configured such that the same voltage (DC 18 volts) is applied between the positive terminal P1 and the negative terminal N1 of the first machine-side-connecting section 22c and between the positive terminal P2 and the negative terminal N2 of the second machine-side-connecting section 22d.

As a result, a voltage of DC 18 volts is applied to the first battery connection port 127c and the second battery connection port 127d of the electric machine 12 via the first machine-side-connecting section 22c and the second machine-side-connecting section 22d, respectively, of the battery adapter 50. That is, a voltage of DC 36 volts is applied to the motor 12m of the electric machine 12. The voltage of the first battery connection port 127c (DC 18 volts) and the voltage of the second battery connection port 127d (DC 18 volts) are connected in series.

Accordingly, it is possible to drive the electric machine 12 rated at 3 VDC, which is provided with a first battery connection port 127c and a second battery connection port 127d, by use of a single battery 60 rated at 18 VDC.

The above construction may not be limited by the above-described example and various changes may be made without departing from the scope of the invention. In FIG. 10, a voltage of DC 36 volts is applied to the motor 12m by connecting the first battery connection port 127c and the second battery connection port 127d of the electric machine 12 in series.

Figure 11:
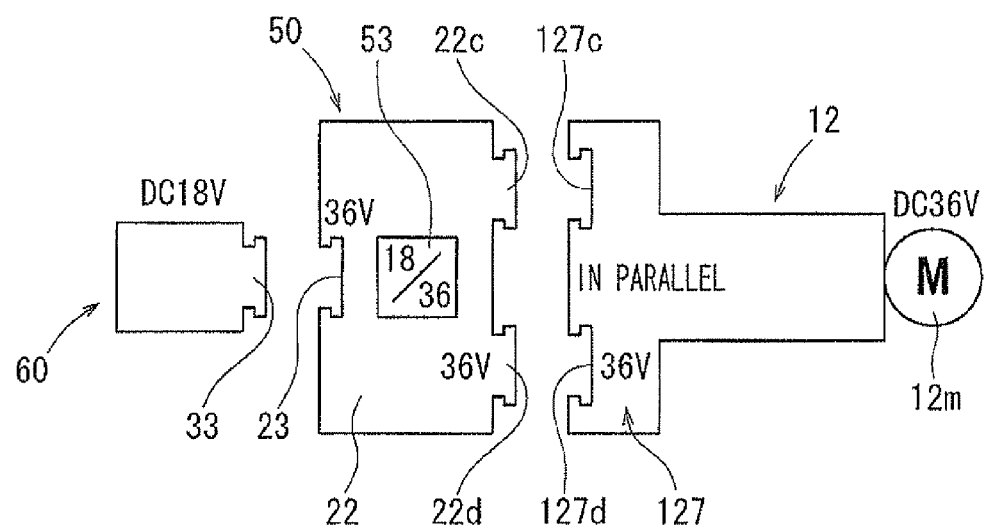
FIG. 11 is a diagram showing the configuration of an electric machine according to another example.
Figure 12:
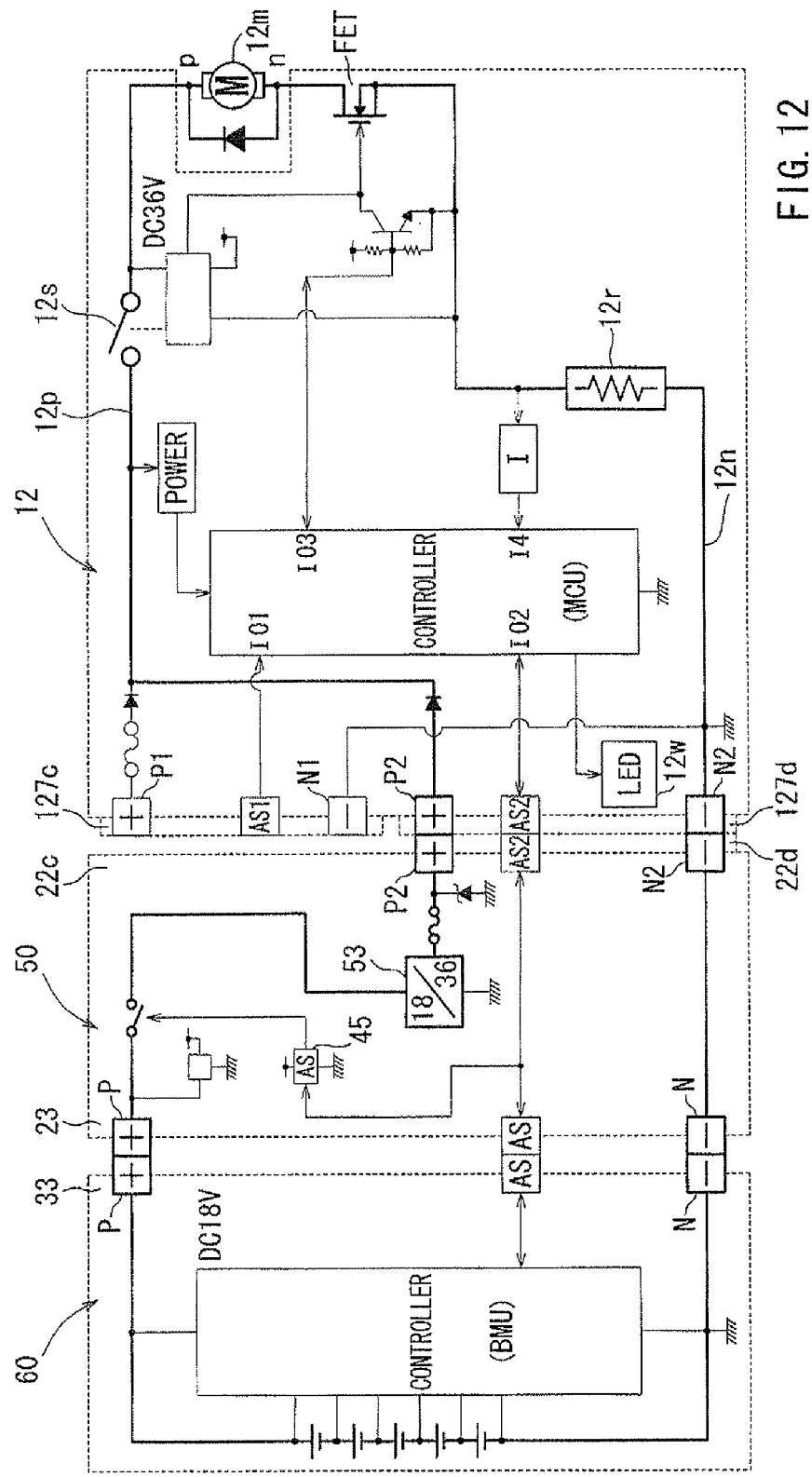
FIG. 12 is a schematic block diagram showing an electric circuit of the electric machine.

However, as shown in FIGS. 11 and 12, it is possible to apply a voltage of DC 36 volts between the terminals P2 and N2 of the second machine-side-connecting section 22d of the battery adapter 50, without mounting the constant-voltage circuit 25. As a result, it is possible to use the battery adapter 50 for the electric machine 12 in which a battery rated at 36 VDC is connected to the first battery connection port 127c and the second battery connection port 127d in parallel, as shown in FIG. 12.

Figure 13:
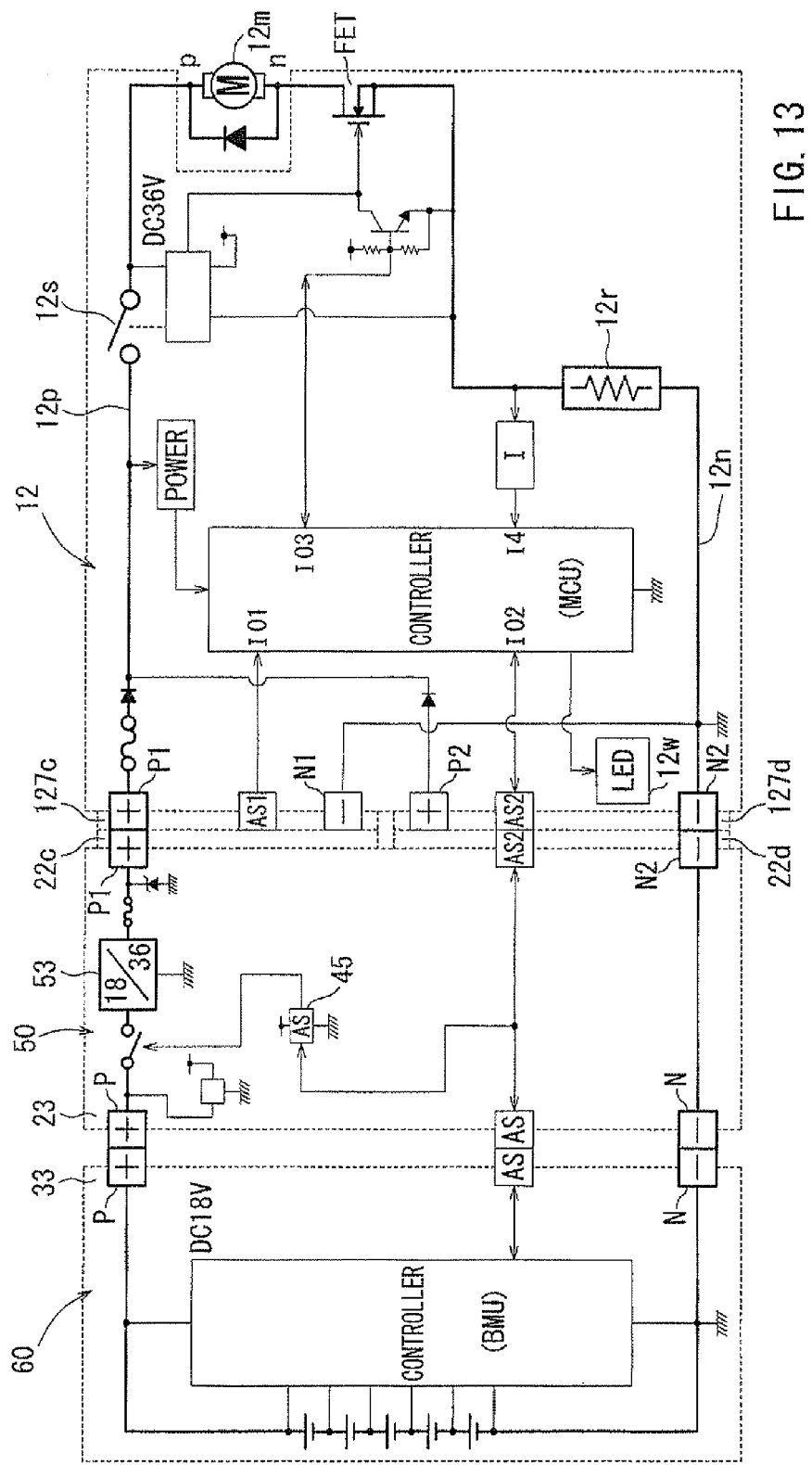
FIG. 13 is a schematic block diagram showing the electric circuit of the electric machine.
Figure 14:
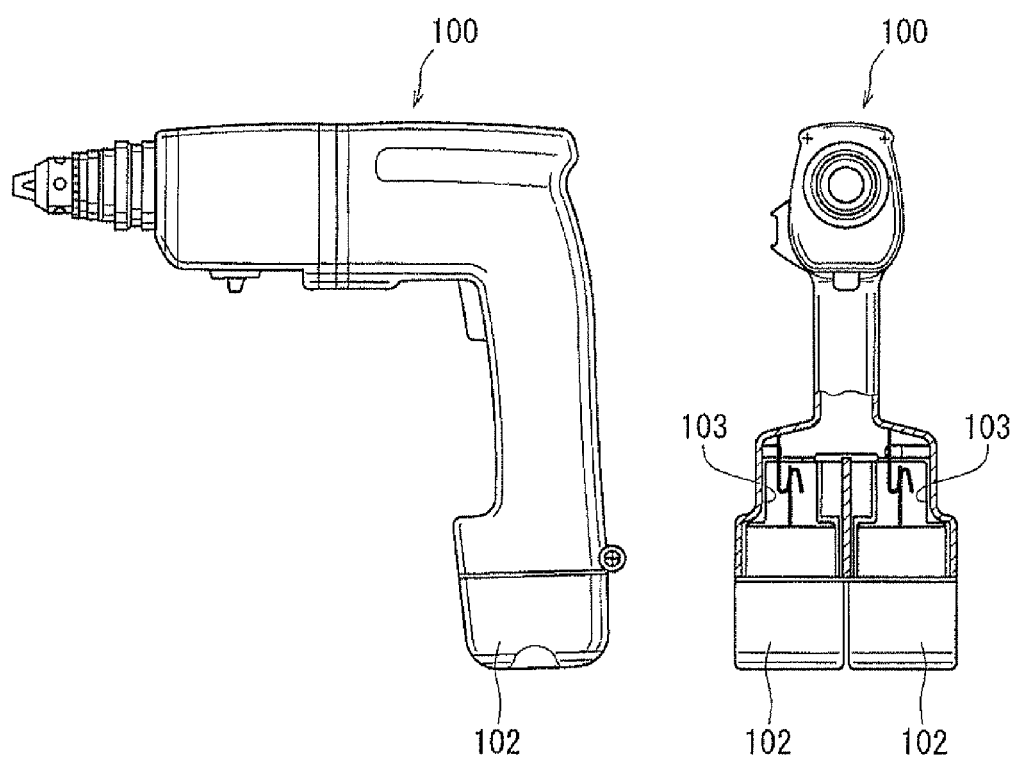
FIG. 14 is a side and a front view of a conventional electric tool provided with a pair of seats or sockets for respective battery packs.

Further, as shown in FIG. 13, it is also possible to apply a voltage of DC 36 volts between the positive terminal P1 of the first machine-side-connecting section 22c and the negative terminal N2 of the second machine-side-connecting section 22d of the battery adapter 50, without mounting the constant-voltage circuit 25. As a result, it is possible to use the battery adapter 50 for the electric machine 12 in which a battery rated at 36 VDC is connected to each of the first battery connection port 127c and the second battery connection port 127d in parallel, as shown in FIG. 13.

In the first example to the third example, the battery adapter 20, 40, and 50 is provided with two machine-side-connecting sections 22c and 22d and one battery-side-connecting section 23. However, it is also possible to change the number of machine-side-connecting sections and the number of battery-side-connecting sections as appropriate but preferably such that the number of machine-side-connecting sections is larger than the number of battery-side-connecting sections.

Further, in the first through the third examples, the blower 10 is shown as an example of the electric machine 12. However, a chain saw, a hedge trimmer, and other electric tools such as those for a drill or an electric screwdriver that use an external battery or batteries can also be used with the invention.

We claim:

1. A battery adapter, comprising a plurality of machine-side-connecting sections that can be connected to a plurality of battery-connecting ports provided on an electric machine and also comprising a battery-side-connecting section that can be connected to a battery such that the electric machine is drivable by the battery when the electric machine is connected to the machine-side-connecting sections of the battery adapter via the battery-connecting ports of the electric machine and the battery is connected to the battery-side-connecting section of the battery adapter, wherein;
   each of the machine-side-connecting sections comprises a positive terminal and a negative terminal and the battery-side-connecting section comprises a positive terminal and a negative terminal.

2. The battery adapter according to claim 1, wherein there are a plurality of battery-side-connecting sections and further that the number of the machine-side-connecting sections is configured to be larger than the number of the battery-side-connecting sections and further wherein each of the plurality of battery-side-connecting sections comprises a positive terminal and a negative terminal.

3. The battery adapter according to claim 1, wherein the electric machine connected to the machine-side-connecting sections of the battery adapter via the battery-connecting ports of the electric machine can be driven by a battery the nominal voltage of which is substantially equal to the rated voltage of a motor of the electric machine, the battery being connected to the battery-side-connecting section of the battery adapter.

4. The battery adapter according to claim 3, wherein the sum of the voltages applied to the machine-side-connecting sections of the battery adapter is equal to the rated voltage of the motor of the electric machine.

5. The battery adapter according to claim 1, wherein the battery adapter includes a step-down section that is configured to reduce the battery voltage applied to the battery-side-connecting section; and
   the output voltage of the step-down section is configured to be equal to the rated voltage of the motor of the electric machine.

6. The battery adapter according to claim 2, wherein the battery adapter includes a step-down section that is configured to reduce the battery voltage applied to the battery-side-connecting sections; and
   the output voltage of the step-down section is configured to be equal to the rated voltage of the motor of the electric machine.

7. The battery adapter according to claim 5, wherein the output voltage of the step-down section is equal to the voltage applied to one of the machine-side-connecting sections.

8. The battery adapter according to claim 5, wherein the output voltage of the step-down section is applied between positive and negative terminals of different sets of the plurality of machine-side-connecting sections.

9. The battery adapter according to claim 1, wherein the battery includes a step-up section configured to increase the battery voltage applied to the battery-side-connecting section; and
   the output voltage of the step-up section is configured to be equal to the rated voltage of the motor of the electric machine.

10. The battery adapter according to claim 2, wherein the battery includes a step-up section configured to increase the battery voltage applied to the battery-side-connecting sections; and
    the output voltage of the step-up section is configured to be equal to the rated voltage of the motor of the electric machine.

11. The battery adapter according to claim 9, wherein the output voltage of the step-up section is configured to be equal to the sum of the voltages applied to the machine-side-connecting sections.

12. The battery adapter according to claim 9, wherein the output voltage of the step-up section is equal to the voltage applied to one of the machine-side-connecting sections.

13. The battery adapter according to claim 9, wherein the output voltage of the step-up section is applied between positive and negative terminals of different sets of the plurality of machine-side-connecting sections.

14. A battery adapter for use with an electric machine, comprising:
    a battery-side-connection section configured to receive a battery voltage from one or more batteries; and
    a plurality of machine-side-connecting sections configured to transmit an output voltage from the battery adapter to the electric machine,
    wherein the number of machine-side-connections is greater than the number of battery-side-connections; and
    wherein the battery adapter has a step-up and step-down function configured to adjust the battery voltage such that the output voltage from the machine-side-connecting sections is sufficient to power the electric machine.

15. A battery adapter comprising a plurality of machine-side-connecting sections configured to be connected to a plurality of battery-connecting ports provided on an electric machine and also comprising a battery-side-connecting section configured to be connected to a battery such that the electric machine is drivable by the battery when the electric machine is connected to the machine-side-connecting sections of the battery adapter via the battery-connecting ports of the electric machine and the battery is connected to the battery-side-connecting section of the battery adapter, wherein:
    the number of machine-side-connections is greater than the number of battery-side-connections;

a battery-side-signal terminal that is connected to a signal terminal of the battery is provided in the battery-side-connecting section;

a machine-side-signal terminal that is connected to a signal terminal of the battery-connecting port on the electric machine is provided in the machine-side-connecting section;

a signal is transmitted between the signal terminal of the battery and the signal terminal of the battery-connecting port on the electric machine via the battery-side-signal terminal and the machine-side-signal terminal of the battery adapter; and the number of machine-side-signal terminals is greater than the number of battery-side-signal terminals.

16. The battery adapter according to claim 15, wherein:

a plurality of machine-side-signal terminals are provided in the battery-side-connecting sections; and at least one of the machine-side-signal terminals transmits a discharge enable signal that permits discharge of the battery.

17. The battery adapter according to claim 16, wherein the discharge enable signal is transmitted when the battery is connected to the battery-side-connecting section.

18. The battery adapter according to claim 17, wherein a machine-side-signal terminal other than the machine-side-signal terminal that transmits the discharge enable signal transmits a discharge enable signal that permits discharge of the battery or a discharge inhibit signal that inhibits discharge of the battery.

19. The battery adapter according to claim 15, wherein a discharge enable signal that permits discharge of the battery or an overload signal of the electric machine is transmitted between the battery and the electric machine via the battery-side-signal terminal and the machine-side-signal terminal of the battery adapter.

\* \* \* \* \*